(No Model.)
R. J. PRATT.
GALVANIC BATTERY.
No. 402,104. Patented Apr. 23, 1889.
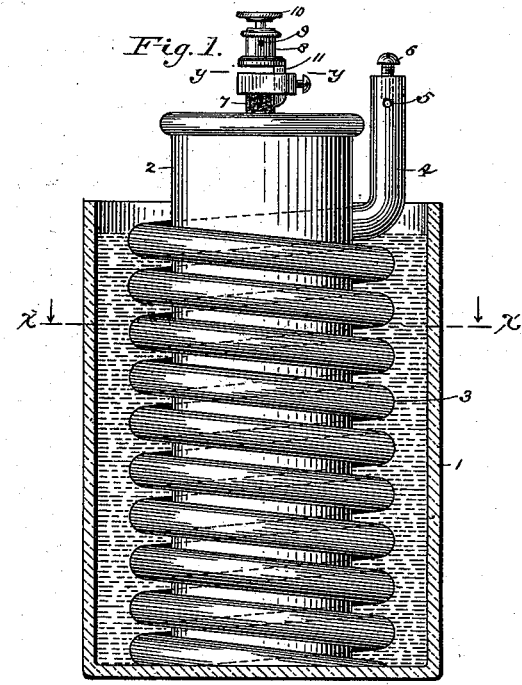
Fig. 1.
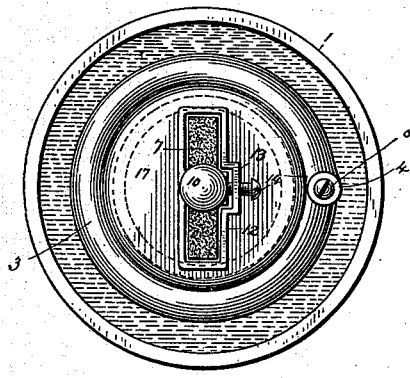
Fig. 2.
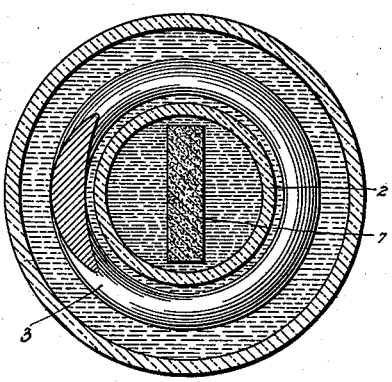
Fig. 3.
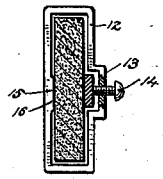
Fig. 4.
Fig. 5.
WITNESSES:
H. W. Elmore
Edw. S. Hutchins
INVENTOR
Robert J. Pratt
BY
John C. Pennie
ATTORNEY.

UNITED STATES PATENT OFFICE.

ROBERT J. PRATT, OF GREENBUSH HEIGHTS, NEW YORK, ASSIGNOR TO THE WATER PRIMARY BATTERY COMPANY, OF JERSEY CITY, NEW JERSEY.

GALVANIC BATTERY.

SPECIFICATION forming part of Letters Patent No. 402,104, dated April 23, 1889.

Application filed February 27, 1889. Serial No. 301,365. (No model.)

*To all whom it may concern:*

Be it known that I, ROBERT J. PRATT, a citizen of the United States, residing at Greenbush Heights, in the county of Rensselaer and State of New York, have invented certain new and useful Improvements in Galvanic Batteries; and I do hereby declare the following to be a full, clear, and exact description of the invention, such as will enable others skilled in the art to which it appertains to make and use the same.

My invention relates to certain new and useful improvements in galvanic batteries, and is particularly adapted to that kind of batteries described in the patent of P. R. de F. D'Humy, dated August 2, 1887, No. 367,705, wherein a positive electrode of metal immersed in water is employed (said water being maintained practically unacidulated during the operation of the battery by flushing) and a negative electrode of carbon in contact with an acid or a mixture of acids. In batteries of this description it is desirable to secure for the positive electrode, which is preferably made of wrought-iron, as large an extent of surface exposure as can be obtained, while at the same time the construction of the electrode should be such as to bring it as closely as possible to the exterior walls of the porous cup separating it from the negative electrode. It is also desirable, for reasons of economy, that the electrode should be cheap in point of manufacture, and that the construction should be such that in flushing the water-compartment all deposits that may have taken place upon the electrode may be carried off with the flush-water, so that the surface may be kept clean and free from accumulations. In the accomplishment of these ends I have devised the construction illustrated in the accompanying drawings, wherein—

Figure 1 represents a central vertical section through the water-compartment of the battery, the positive electrode and the porous cup containing the negative electrode being shown in side elevation. Fig. 2 represents a plan view of the battery. Fig. 3 represents a transverse section taken on the plane indicated by the line $x\ x$ of Fig. 1. Fig. 4 represents a sectional view of the negative electrode and its clamping device, taken on the plane indicated by the line $y\ y$ of Fig. 1; and Fig. 5 represents, on an enlarged scale and partially broken away, a portion of said clamping device.

Similar numerals of reference indicate similar parts throughout the several views.

Referring to the figures of the drawings, 1 indicates the outer or water compartment of the battery, and 2 indicates the inner porous receptacle containing the negative electrolyte, consisting of nitric acid or a mixture of acids of the kind more fully set forth in the patent to D'Humy above referred to. Surrounding the porous cell 2 is the positive electrode, consisting of a cylindrical rod of wrought-iron wound in spiral convolutions 3, the lower convolution resting upon the bottom of the water-compartment and the upper convolution terminating in an upright projection, 4, perforated at 5 for the reception of one of the circuit-terminals and provided with a set-screw, 6, for clamping said terminal in place, thereby furnishing an extremely cheap and efficient connection. The internal diameter of the convolutions constituting the positive electrode is slightly larger than the external diameter of the porous cup 2, thereby leaving a small annular space between the positive electrode and said external wall, so that while the two are substantially in close proximity to each other no deposits or accumulations can be lodged between them. The positive electrode may be readily formed from the straight cylindrical rod by being wound upon a suitable drum provided for the purpose.

I have found it of particular advantage to construct the spiral from iron circular in cross-section, as it has been found on experiment that where the iron is square, hexagonal, or otherwise irregular in cross-section the electrode is attacked with considerable energy at the projecting corners. The inclined position or slant of the convolutions, as illustrated in the drawings, is also of moment, as it not only lessens the liability of deposits or accumulations upon the upper sides of said convolutions, but also assists materially in freeing said surfaces during the flushing operation from any such deposits. The spacing between the convolutions and the intermediate interval between the electrode and the porous cell 2 also assist in facilitating the flushing of the electrode. The negative or carbon electrode 7 of the battery is provided with a binding-post, 8, having a perforation, 9, for the reception of the circuit-terminal, and a set-screw, 10, for securing said terminal in place. The binding-post is provided with a dependent lug, 11, adapted to fit against the side of the negative electrode and to be clamped against the same by means of a rectangular clamping-frame, 12, of conducting material, having a yoke, 13, through which passes a clamping-screw, 14. The frame is also provided with an offset or flat projection, 15, as shown more clearly in Fig. 5, and the said projection and the dependent lug 11 are each provided with a facing of platinum on the side proximate to the carbon plate, said coating of platinum being indicated by the number 16 in Fig. 5.

The porous cell 2 is provided with a cover, 17, slotted for the passage of the negative electrode, and when the cover and the clamp for the binding-post connection have been put in place the entire top of the carbon element is preferably coated with an acid-proof and water-proof composition of any suitable character, so as to protect the surfaces of contact from oxidation.

Having thus described my invention, what I claim is—

1. In a galvanic battery of the kind described, the combination, with the compartment 1, of the porous cell 2 and its negative electrode, and a positive electrode consisting of a spirally-wound cylindrical bar of wrought-iron resting upon the bottom of the compartment 1 and encompassing the porous cell, the convolutions of said spiral being separated from each other by an intervening space, and the interior of the spiral being also separated from the porous cell by an intervening space, substantially as described.

2. In a galvanic battery of the kind described, the combination, with the compartment 1, of the porous cell 2 and its negative electrode, and a positive electrode consisting of a spirally-wound cylindrical bar of wrought-iron resting upon the bottom of the compartment 1 and encompassing the porous cell, the convolutions of said spiral being separated from each other by an intervening space, and the interior of the spiral being also separated from the porous cell by an intervening space, said spiral terminating in an upright projection, 4, constituting a binding-post therefor, substantially as described.

3. In a galvanic battery of the kind described, the combination, with the compartment 1, of the porous cell 2 and its negative electrode, and a positive electrode consisting of a spirally-wound bar of wrought-iron encompassing the porous cell, the convolutions of said spiral being separated from each other by an intervening space, and the interior of the spiral being also separated from the porous cell by an intervening space, substantially as described.

4. In a galvanic battery, the combination, with the negative electrode, of a rectangular frame, 12, of conducting material, provided with an offset, 15, faced with platinum, a clamping-screw, 14, and a binding-post, 8, having a lug, 11, faced with platinum, substantially as described.

In testimony whereof I affix my signature in presence of two witnesses.

ROBERT J. PRATT.

Witnesses:
O. F. BROWNING,
B. C. BROWNING.